United States Patent
Joy

(10) Patent No.: US 9,535,737 B2
(45) Date of Patent: Jan. 3, 2017

(54) DYNAMIC VIRTUAL PORT PROVISIONING

(71) Applicant: BLADELOGIC, INC, Houston, TX (US)

(72) Inventor: Ajai Joy, Tyngsboro, MA (US)

(73) Assignee: BladeLogic, Inc., Houston, TX (US)

( * ) Notice: Subject to any disclaimer, the term of this patent is extended or adjusted under 35 U.S.C. 154(b) by 36 days.

(21) Appl. No.: 14/610,117

(22) Filed: Jan. 30, 2015

(65) Prior Publication Data

US 2016/0224363 A1   Aug. 4, 2016

(51) Int. Cl.
| | |
|---|---|
| G06F 9/46 | (2006.01) |
| G06F 9/455 | (2006.01) |
| H04L 12/24 | (2006.01) |
| H04L 12/931 | (2013.01) |

(52) U.S. Cl.
CPC ....... *G06F 9/45558* (2013.01); *H04L 41/0803* (2013.01); *H04L 49/70* (2013.01); *G06F 2009/4557* (2013.01); *G06F 2009/45583* (2013.01); *G06F 2009/45591* (2013.01); *G06F 2009/45595* (2013.01)

(58) Field of Classification Search
CPC ............... G06F 9/45558; G06F 2009/4557; G06F 2009/45591; G06F 2009/45583; H04L 49/70
See application file for complete search history.

(56) References Cited

U.S. PATENT DOCUMENTS

| | | | | |
|---|---|---|---|---|
| 7,855,957 | B2 * | 12/2010 | Madhi, II | H04L 45/245 370/229 |
| 2006/0230185 | A1 * | 10/2006 | Errickson | H04L 49/35 709/250 |
| 2015/0043334 | A1 * | 2/2015 | Antony | G06F 9/45533 370/230 |

OTHER PUBLICATIONS

VMware Infrastructure Architecture Overview, White Paper, VMware, Inc., 2006, 14 pages.
Virtualization Overview, White Paper, VMware, Inc., 2006, 11 pages.

* cited by examiner

*Primary Examiner* — Camquy Truong
(74) *Attorney, Agent, or Firm* — Brake Hughes Bellermann LLP

(57) ABSTRACT

In a general aspect, a computer-implemented method can include provisioning a virtual network on a hypervisor server. The method can also include querying the hypervisor server to determine an allowable range for a number of virtual ports of a first port group of a virtual switch implemented on the hypervisor server, the first port group being associated with the virtual network. The method can further include provisioning at least one virtual machine on the virtual network including assigning a respective virtual port of the first port group to the virtual machine. The method can still further include monitoring usage of the virtual ports of the first port group and, in response to the usage of the virtual ports of the first port group exceeding a threshold, instructing the hypervisor server to provision a second port group on the virtual switch, the second port group being associated with the virtual network.

20 Claims, 4 Drawing Sheets

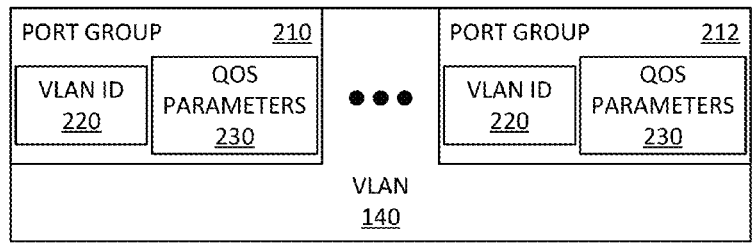
FIG. 2
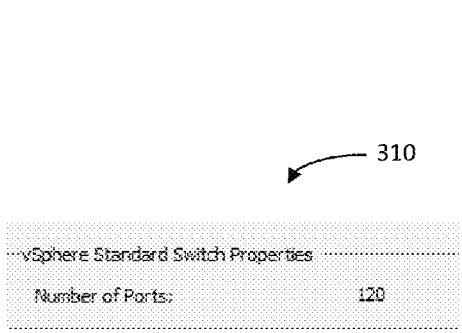
FIG. 3A
FIG. 3B

DYNAMIC VIRTUAL PORT PROVISIONING

TECHNICAL FIELD

This description relates to provisioning of virtual computing resources. More specifically, this description relates to dynamic provisioning of virtual ports for virtual networks.

BACKGROUND

Cloud computing services are generally classified into three "layers", or types of service. These layers, which typically are referred to as conceptually "sitting on top" of one another are, from bottom to top, Infrastructure-as-a-Service (IaaS), Platform-as-a-Service (PaaS) and Software-as-a-Service (SaaS).

IaaS refers to providing virtual computing infrastructure (e.g., cloud-computing infrastructure) resources, such as virtual processors, virtual volatile memory (e.g., random access memory (RAM)), virtual non-volatile memory (e.g., disk storage), virtual networking, etc. For instance, an IaaS provider may own and manage a set of physical computing resources (e.g., in a data center network) that are virtualized through a virtualization layer (which can also be referred to as a hypervisor, a hypervisor server, a virtualization server, etc.). A hypervisor (which can also be referred to as a virtual machine monitor (VMM)) can be implemented as computer software, firmware and/or hardware, which can be used to create (provision) and run virtual machines. A computer on which a hypervisor is implemented and is used to run (host) one or more virtual machines can be referred to as a host machine. Each virtual machine implemented on a hypervisor may be referred to as a guest machine of that host machine.

Clients (users) of an IaaS provider's services can access the virtualized computing resources to implement (provision) virtual servers and/or virtual computers (which can also be referred to, collectively, as virtual machines) including installing (implementing) desired operating systems and/or user software applications on the virtual machines. Such virtualized computing resources can also be used to implement (provision) virtual private networks (e.g., virtual local area networks (VLANs)) and virtual (cloud) data storage.

PaaS refers to providing virtual computing platforms over a network, such as the Internet or private computing networks, as two examples. PaaS providers may provide their customers (users) with virtual computing platforms that include specific, respective operating systems (O/Ss) and runtime environment components. Such PaaS virtual computing platforms can be used for developing and deploying software applications, application hosting, data storage and/or collaboration tools, as some examples.

SaaS refers to providing end-user software applications (services) over a network (e.g., cloud-based application or services). For instance, SaaS providers may provide entertainment and/or business applications to end-users over the Internet using, for example, IaaS and PaaS infrastructures for delivering those services to their customers (users). Some examples of SaaS applications are media streaming (e.g., movies and/or music), business conferencing tools and business productivity (such as word processors, spreadsheet editors, and so forth).

One challenge when providing cloud computing services is efficiently using virtualized computing resources that are provided at an IaaS layer. For example, when provisioning a virtual network using virtualized computing resources that are provided from a hypervisor (virtualization server), it is desirable to provision those resources, such as a number of virtual port groups (each having a number of virtual ports) provisioned, based on expected usage of the virtual network (e.g., an anticipated number of virtual workloads that will be connected at a given time). Over provisioning (e.g., provisioning too many virtual port groups) may result in inefficient use of the available virtual computing resources, as provisioned resources may sit idle.

Likewise, virtual computing resources can be underutilized if a virtual network has available virtual computing resources and available network addresses (e.g., Internet Protocol (IP) addresses) but does not have any available virtual ports to (virtually) connect additional virtual workloads (virtual machines) to the virtual network. Such underutilization can result from a number of factors, such as changes in the available virtual computing resources, the specific configuration of virtual switches that are used to implement the virtual ports of the virtual network, changes in the number of virtual workloads provisioned on a given virtual network, and so forth. Accordingly, alternative approaches for provisioning virtual ports are desirable.

SUMMARY

According to a general aspect, a computer-implemented method can include provisioning a virtual network on a hypervisor server, where the hypervisor server is configured to provide virtual computing resources for implementing the virtual network. The method can further include querying the hypervisor server to determine an allowable range for a number of virtual ports of a first port group of a virtual switch implemented on the hypervisor server, where the first port group is associated with the virtual network. The method can still further include provisioning at least one virtual machine on the virtual network. The provisioning of a virtual machine of the at least one virtual machine can include assigning a respective virtual port of the first port group to the virtual machine. The method can also further include monitoring usage of the virtual ports of the first port group and, in response to the usage of the virtual ports of the first port group exceeding a threshold, instructing the hypervisor server to provision a second port group on the virtual switch. The second port group can be associated with the virtual network.

Implementations can include one or more of the following features. For instance, a number of virtual ports in the second port group can be equal to the number of virtual ports in the first port group. The number of virtual ports in the second port group and the number of virtual ports in the first port group can be equal to a largest value in the allowable range. A number of virtual ports in the second port group can be different than the number of virtual ports in the first port group. The number of virtual ports in the first port group can be equal to a largest value in the allowable range and the number of virtual ports in the second port group can be less than the largest value in the allowable range. A number of virtual ports in the second port group can be equal to a number of unassigned Internet Protocol (IP) addresses of the virtual network. A number of virtual ports in the second port group can be based on a rate of consumption of virtual ports in the first port group.

Provisioning the second port group can include provisioning the second port group with a same set of quality of service parameters as the first port group.

Assigning the respective virtual port of the first port group to the virtual machine can include assigning a respective Internet Protocol (IP) address of the virtual network to a virtual network-interface card of the virtual machine.

The threshold can be a first threshold, and the computer-implemented method can include monitoring usage of the virtual ports of the second port group and, in response to the usage of the virtual ports in the second port group exceeding a second threshold, instructing the hypervisor server to provision a third port group on the virtual switch, the third port group being associated with the virtual network. The second threshold can be different than the first threshold.

Monitoring the usage of the virtual ports of the first port group can be performed in response to the provisioning of the virtual machine of the at least one virtual machine. The method can include monitoring an amount of available virtual computing resources of the virtual network. A number of virtual ports in the second port group can be based on the amount of available virtual computing resources. Monitoring the amount of available virtual computing resources of the virtual network can be performed in response to the provisioning of the virtual machine of the at least one virtual machine.

In another general aspect, a non-transitory computer-readable storage medium can have instructions recorded and stored thereon. The instructions, when executed by a computing device, can cause the computing device to provision a virtual network on a hypervisor server. The hypervisor server can be configured to provide virtual computing resources for implementing the virtual network. The instructions, when executed by the computing device, can further cause the computing device to query the hypervisor server to determine an allowable range for a number of virtual ports of a first port group of a virtual switch implemented on the hypervisor server, where the first port group is associated with the virtual network. The instructions, when executed by the computing device, can still further cause the computing device to provision at least one virtual machine on the virtual network. The provisioning of a virtual machine of the at least one virtual machine can include assigning a respective virtual port of the first port group to the virtual machine. The instructions, when executed by the computing device, can also further cause the computing device to monitor usage of the virtual ports of the first port group and, in response to the usage of the virtual ports of the first port group exceeding a threshold, instruct the hypervisor server to provision a second port group on the virtual switch. The second port group can be associated with the virtual network.

Implementations can include one or more of the following features. For instance, the threshold can be a first threshold. The instructions, when executed by the computing device, can cause the computing device to monitor usage of the virtual ports of the second port group and, in response to the usage of the virtual ports in the second port group exceeding a second threshold, instruct the hypervisor server to provision a third port group on the virtual switch, the second port group being associated with the virtual network. The instructions, when executed by the computing device, can further cause the computing device to monitor an amount of available virtual computing resources of the virtual network. A number of virtual ports in the second port group can be based on the amount of available virtual computing resources.

In another general aspect, a system can include a host server including a set of physical computing resources, a hypervisor server configured to virtualize the set of physical computing resources of the host server and a virtual network management server. The virtual network management server can include at least one memory that is configured to store instructions and at least one processor that is operably coupled to the at least one memory. The at least one processor can be configured to process the instructions to cause the virtual network management server to provision a virtual network on the hypervisor server, the hypervisor server being configured to provide virtual computing resources for implementing the virtual network. The instructions, when processed by the at least one processor, can further cause the virtual network management server to query the hypervisor server to determine an allowable range for a number of virtual ports of a first port group of a virtual switch implemented on the hypervisor server, where the first port group can be associated with the virtual network. The instructions, when processed by the at least one processor, can further cause the virtual network management server to provision at least one virtual machine on the virtual network. The provisioning of a virtual machine of the at least one virtual machine can include assigning a respective virtual port of the first port group to the virtual machine. The instructions, when processed by the at least one processor, can still further cause the virtual network management server to monitor usage of the virtual ports of the first port group and, in response to the usage of the virtual ports of the first port group exceeding a threshold, instruct the hypervisor server to provision a second port group on the virtual switch. The second port group can be associated with the virtual network.

Implementations can include one or more of the following features. For instance, the host server can be a first host server and the set of physical computing resources can be a first set of physical computing resources. The system can further include a second host server including a second set of physical computing resources; a non-volatile data storage device and a physical data network operationally coupled with the first host server, the second host server and the non-volatile data storage device. The hypervisor server can be configured to virtualize the second set of physical computing resources and the non-volatile data storage device. The set of physical computing resources of the first host sever and/or the second host server can include at least one processor, a non-volatile data storage device and volatile data storage.

The details of one or more implementations are set forth in the accompanying drawings and the description below. Other features will be apparent from the description and drawings, and from the claims.

BRIEF DESCRIPTION OF THE DRAWINGS

FIG. 2 is a block diagram of a virtual local area network (VLAN), according to an example implementation.

FIG. 3A is a diagram illustrating configuration information for a virtual switch, according to example implementations.

FIG. 3B is a diagram illustrating configuration information for another virtual switch, according to example implementations.

Like reference symbols in the various drawings indicate like elements.

DETAILED DESCRIPTION

Figure 1:
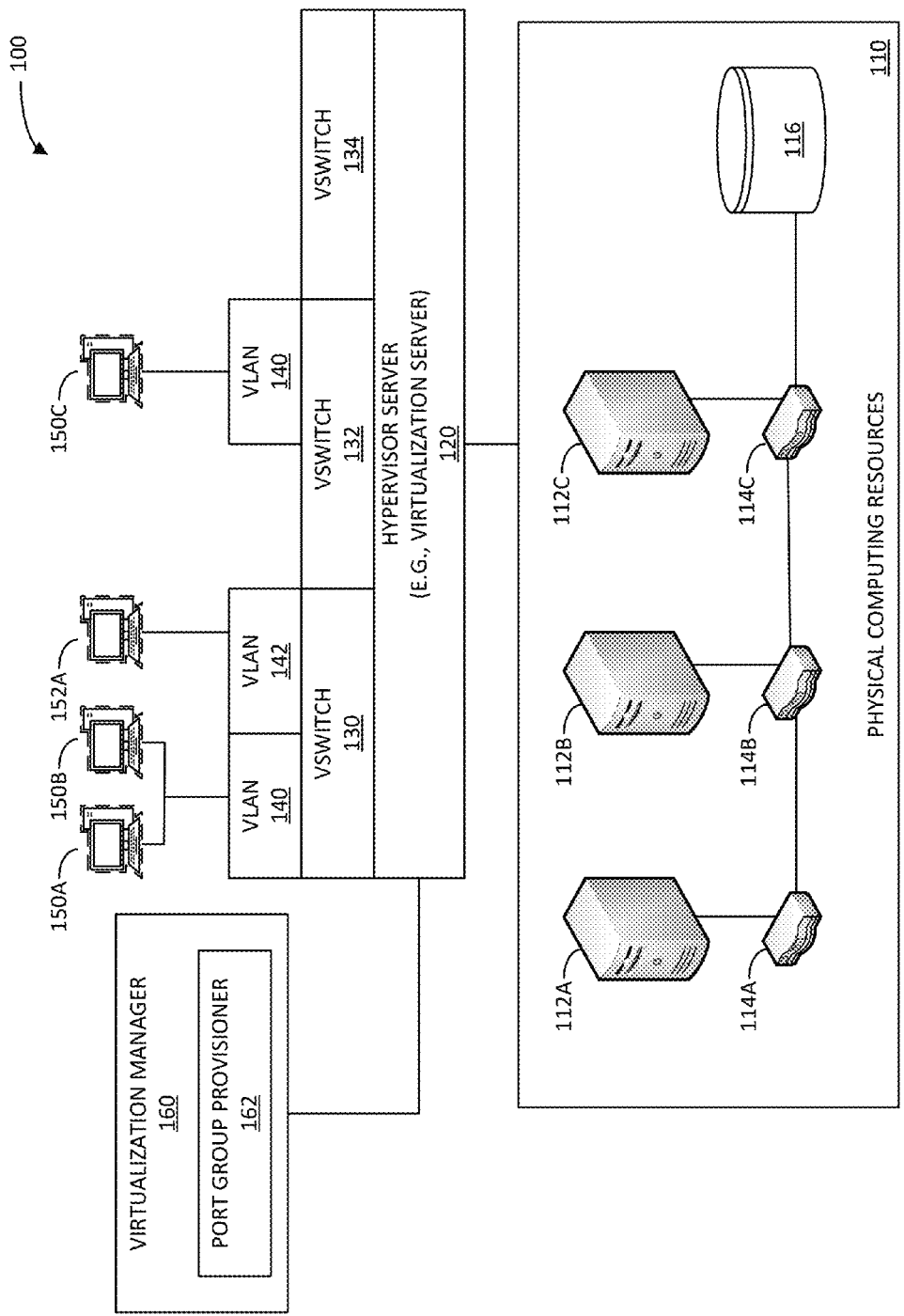
FIG. 1 is a block diagram of a cloud computing system, according to an example implementation.

FIG. 1 is a block diagram of a cloud computing system 100, according to an example implementation. As shown in FIG. 1, the system 100 includes physical computing resources 110; a hypervisor (virtualization) server 120; virtual switches (vSwitches) 130, 132 and 134; virtual local area networks (VLANs) 140 and 142; virtual machines (virtual workloads) 150A, 150B, 150C and 152A; and a virtualization manger 160, which can also be referred to as a virtual network manager server. As shown in FIG. 1, the virtualization manager 160 includes a port group provisioner 162 that can monitor (track) usage of virtual computing resources (e.g., virtual ports used to "connect" virtual machines or virtual workloads to the hypervisor server 120), and dynamically and efficiently provision additional virtual ports (e.g., in virtual port groups or port profiles), based on the monitoring, using the approaches described herein.

It is noted that the arrangement of the system 100 is given for purposes of illustration and by way of example. In other implementations, the approaches described herein can be implemented in cloud computing systems having configurations other than the specific arrangement of the system 100 shown in FIG. 1. For instance, in other implementations, a cloud computing system can be arranged differently, can include more or less of each of the elements of the system 100, can include additional elements other than those shown in FIG. 1, and/or can eliminate one or more of the elements of the system 100. The specific arrangement of a cloud computing system will depend on the specific implementation. As an example, the physical computing resources 110 (and the VLAN 140) of the system 100 could be geographically distributed in multiple data centers that are operationally coupled using a wide area network (WAN).

In the example system 100 shown in FIG. 1, the physical computing resources 110 can include host servers 112A, 112B and 112C; routers 114A, 114B and 114C; and non-volatile (disk) data storage 116. The host servers 112A, 112B and 112C can each include one or more processors (e.g., micro-processors), system (volatile) memory, such as dynamic random access memory (DRAM), as well as other computing resources. The routers 114A, 114B and 114C can be used to facilitate data communication between each of the host servers 112A, 112B and 112C and the non-volatile (disk) data storage 116.

As shown in FIG. 1, the physical computing resources 110 of the system 100 can be operationally coupled with the hypervisor (virtualization) server 120. The hypervisor server 120 can be configured to virtualize the physical computing resources 110, as virtual computing resources, in order to provide Infrastructure-as-a-Service (IaaS) cloud computing resources. For instance, the hypervisor server 120 can virtualize the physical computing resources 110 to implement, for example, one or more virtual processors (microprocessors), virtual RAM and virtual disk storage. While illustrated as separate entities in FIG. 1, the hypervisor server 120 and the physical computing resources 110, in other implementations, can be implemented as a single entity. For instance, the hypervisor server 120 can be implemented using the physical computing resources 110.

In the system 100, those virtual computing resources can be accessed by the virtual machines 150A, 150B, 150C and 152A through the VLANs 140 and 142, where the VLANs 140 and 142 (as well as other VLANs) can be implemented using the vSwitches 130, 132 and 134. Said another way, the virtual machines 150A, 150B, 150C and 152A can be hosted by the hypervisor server 120 (e.g., using the vSwitches 130, 132 and 134, and VLAN 140 and 142). In such approaches, the vSwitches 130, 132 and 134 can implement virtualized data switches of the VLANs 140 and 142 (and other VLANs). In an example implementation, the vSwitches 130, 132 and 134 can be implemented by the hypervisor server 120, while in other implementations the vSwitches 130, 132 and 134 can be implemented using other approaches.

In the system 100, the virtualization manager (virtual network manager server) 160 can include at least one memory (e.g., non-transitory memory) that is configured to store instructions and at least one processor that is operably coupled to the at least one memory, where the processor is configured to process the stored instructions. Those instructions, when processed, can cause the virtualization manger 160 to provide for provisioning a virtual network (such as the VLANs 140 and/or 142) and one or more virtual machines (such as 150A, 150B, 150C and/or 152C) using the virtualized computing resources of the hypervisor server 120. The virtualization manager 160 (e.g., an administrator using the virtualization manager 160) can provision the virtual networks and virtual machines of the system 100 by specifying a set of virtual computing resources (of the hypervisor 120) that are to be used to implement those elements of the system 100.

The instructions of the virtualization manager, when processed by the processor of the virtualization manger, can also cause the virtualization manager 160 to implement the port group provisioner 162. Approaches for dynamically allocating (e.g., using the port provisioner 162) virtual port groups (which can also be referred to as port profiles) that include respective sets of virtual ports are discussed in further detail below.

Briefly, however, the port provisioner 160 can be configured to cause the virtualization manager 160 to query the hypervisor server 120 in order to determine an allowable range for a number of virtual ports that can be included in a port group (or port profile) of an associated vSwitch (e.g., vSwitch 130) that is implemented the on hypervisor server 120. In different implementations, the number of virtual ports in a port group (or port profile) can depend on the specific architecture (manufacturer) of the hypervisor server 120 (or the computing device used to implement the vSwitches 130, 132 and 134), such as discussed below with respect to FIGS. 3A and 3B. This vSwitch configuration information (e.g., number of virtual ports in a port group) can be used by the port group provisioner when monitoring virtual port usage, as well as when dynamically provisioning additional port groups, such as described herein.

The port group provisioner 162 of FIG. 1 can be further configured to monitor usage of the virtual ports of a first port group of the system 100. For instance, in the example shown in FIG. 1, the port group provisioner 162 can monitor virtual port usage for a port group of the VLAN 140. In this instance, the port group being monitored by the port group provisioner 162 can be associated with the VLAN 140 and, therefore, also associated with the vSwitches 130 and 132, as can be seen in FIG. 1.

In certain implementations, the port group provisioner 162 can monitor virtual port usage in response to a virtual workload (virtual machine) being provisioned in the system 100 (and that virtual workload being connected, e.g., using a virtual network interface card (vNIC), to the VLAN 140 using one or more virtual ports of the port group being monitored). If the port group provisioner 162 determines that a virtual port usage threshold (or other criteria) for the monitored port group has been exceeded, the port group provisioner 162 may direct the hypervisor server 120 to provision an additional port group, and associate the newly provisioned port group with the VLAN 140 (e.g., assign the same VLAN identification and quality-of service parameters to the newly provisioned port group as the port group that was being monitored). Various example approaches for allocating the new port group are discussed further below, such as with respect to FIGS. 4A, 4B and 4C.

FIG. 2 is a block diagram of an example configuration of the VLAN 140 of the system 100 shown in FIG. 1, according to an example implementation. As was noted above, because the computing resources used to implement the VLAN 140 are virtual computing resources, the VLAN 140 can be distributed across multiple physical servers (and multiple hypervisor servers). Further, as was also discussed above, the physical servers (and hypervisor servers) that are used to provide the virtual computing resources used to implement the VLAN 140 (and its associated virtual machines) can be co-located, or can be geographically distributed.

While the VLAN 140, as shown in FIG. 2, is illustrated showing two port groups 210 and 212, as is shown in the drawing, the VLAN 140 can include additional port groups. As also shown in FIG. 2, each of the port groups 210 and 212 includes a common VLAN ID 220 and a common set of QoS parameters, which associate the port groups 210 and 212 with the VLAN 140. In this arrangement, any virtual machine (virtual workload) that is "connected" with a virtual port (or multiple virtual ports) of either of the port groups 210 and 212 will be associated with (connected to) the VLAN 140.

In the VLAN 140 shown in FIG. 2, by way of example, the port group 210 could be provisioned when the VLAN 140 is initialized (initially provisioned). In comparison, the port group 212 could be dynamically allocated in response to usage of the virtual ports of the port group 210 exceeding a threshold (or based on one or more specific usage criteria). In other implementations, the VLAN 140 may include additional port groups than those shown in FIG. 2, which can be provisioned when the VLAN 140 is initialized, or can be dynamically provisioned based on usage of virtual ports of previously provisioned port groups meeting specific criteria. Again, example approaches for monitoring virtual port usage and provisioning additional port groups are discussed in further detail below with respect to FIG. 4.

FIGS. 3A and 3B are diagrams illustrating configuration information 310 and 320 for respective vSwitches, according to example implementations. For purposes of illustration, the configuration information 310 and 320 shown in FIGS. 3A and 3B (and their associated vSwitches) will be discussed with further reference to FIGS. 1 and 2, as appropriate. In other implementation, vSwitches corresponding with the configuration 310 and/or 320 can be used in cloud computing systems having other arrangements.

The configuration information 310 and 320 can be provided, e.g., by a software application-programming-interface (API) for a vSwitch that is implemented by a specific hypervisor architecture. For example, the configuration information 310 in FIG. 3A may correspond with a VSphere standard vSwitch (e.g., as implemented in a hypervisor server available from VMware, Inc.), which can be used to implement the vSwitches 130, 132 and/or 134. Likewise, the configuration information 320 in FIG. 3B may correspond with a Nexus distributed switch (e.g., as implemented in a hypervisor server available from Cisco Systems, Inc.), which can be used to implement the vSwitches 130, 132 and/or 134.

The configuration information 310 and/or 320 can be provided to the port group provisioner 162 of the visualization manager 160 in response to a query, where the query is used to access a corresponding exposed software API included in the hypervisor server 120. The port group provisioner 162 can then use the configuration information 310 and/or 320 when monitoring virtual port usage and when dynamically allocating additional port groups, such as using the approaches described herein. As discussed below, the allocation of additional port groups can also be based, in part, on availability of virtual computing resources, such as virtual computing resources of an associated VLAN. For instance, allocation of additional port groups can be based on a number of available Internet Protocol (IP) addresses, available virtual CPUs, available virtual DRAM and/or available disk storage capacity, as some examples.

Figure 4A:
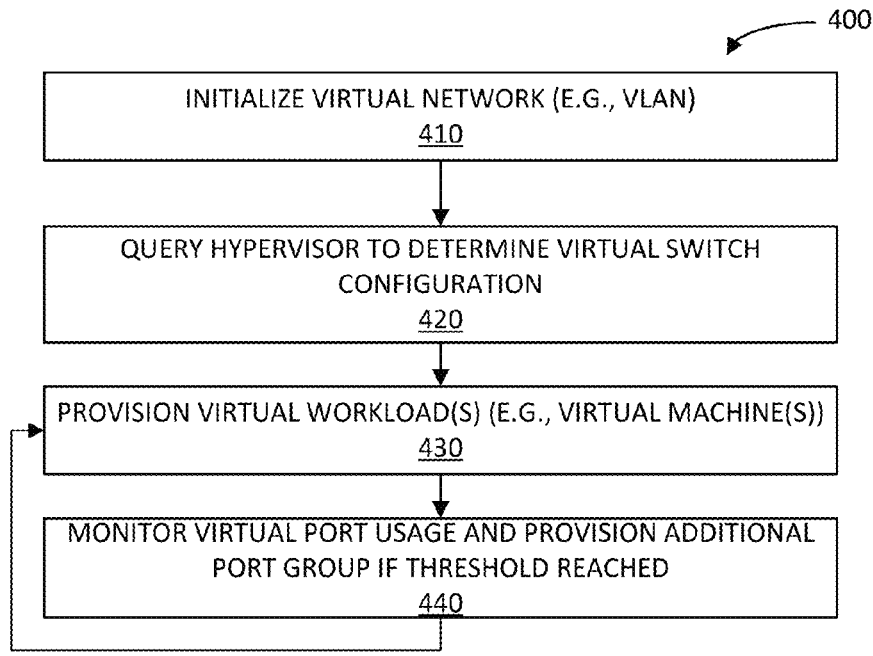
FIG. 4A is a flowchart illustrating a method for dynamic provisioning of virtual ports (e.g., port groups or port profiles), according to an example implementation.

FIG. 4A is a flowchart illustrating a method 400 for dynamic provisioning of virtual ports (e.g., as port groups or port profiles), according to an example implementation. The method 400 (as well as the associated methods shown in FIGS. 4B and 4C) can be implemented using the systems, apparatus and approaches illustrated in FIGS. 1-3B. Therefore, for purposes of illustration, these methods will be described with reference, as appropriate, to the other drawings of the application. It will be appreciated, however, that these methods can be implemented in cloud computing systems having other arrangements and/or that are implemented using other approaches and/or elements.

As shown in FIG. 4A, the method 400 can include, at block 410, initializing (provisioning) a virtual network (VLAN 140 or 142) on the hypervisor server 120 (using vSwitch 130, 132 and/or 134). As described herein, the hypervisor server 120 can be configured to provide virtual computing resources, based on the underlying physical computing resources 110, to implement the virtual network of block 410. In this example, the VLAN of block 410 can be provisioned using the virtualization manager 160 of FIG. 1. For purposes of clarity and illustration, the discussion of the methods of FIGS. 4A-4C below will be made with reference to the vSwitch 130 and the VLAN 140.

At block 420, the method 400 can include the port group provisioner 162 querying the hypervisor server 120 to determine an allowable range for a number of virtual ports (e.g., such as in the examples shown in FIGS. 3A and 3B) of a first port group (or port profile) of the vSwitch 130 (e.g., used to implement the VLAN 140) that that is implemented on the hypervisor server 120. In this example, the first port group (or port profile) can be the port group 210 of FIG. 2, which is associated with the VLAN 140.

At block 430, the method 400 can include provisioning at least one virtual machine (virtual workload), such as the virtual machine 150A, on the VLAN 140. In an implementation, the provisioning of the virtual machine 150A can include assigning a respective virtual port of the first port group 210 to the virtual machine 150A Assigning a virtual port to the virtual machine 150A can also include assigning an IP address of the VLAN 140 (where the assigned IP address corresponds with the assigned virtual port) to a vNIC of the virtual machine 150A, where the VLAN 140 has a group of associated IP addresses for assigning to virtual workloads, e.g., such as the virtual machine 150A, to connect the virtual workloads with the virtual computing resources provided by the hypervisor server 120.

At block 440, the method 440 includes monitoring usage of the virtual ports of the first virtual port group 210. A number of approaches can be used for monitoring the use of virtual ports, some examples of which are described herein. In an implementation, in response to usage of the virtual ports of the first port group 210 exceeding a threshold (or meeting a usage criteria) at block 430, the port group provisioner 163 can instruct the hypervisor server 120 to provision a second virtual port group (e.g., the virtual port group 220 of FIG. 2) on the vSwitch 130, where the second virtual port group 220 is also associated with the VLAN 140. For instance, provisioning the second virtual port group 220 may include provisioning the second virtual port group 220 with a same VLAN identifier as the virtual port group 210, as well as with a same set of QoS parameters as the virtual port group 210. This approach would result in the second virtual port group 220 also being associated with the VLAN 140.

In the method 400, if a corresponding usage threshold (or usage criteria) is not exceeded (or met) at block 440, the port group provisioner 162 may not instruct the hypervisor server 120 to provision another virtual port group. In this situation, the method 400 may return to block 430 and the port group provision 162 may await the provisioning of another virtual workload, such as the virtual machine 150B, for example, before continuing on to block 440 again. In the approach of FIG. 4, the monitoring (and provisioning) of block 440 can be performed (e.g., by the virtual port provisioner 162) in response to the provisioning of a virtual workload, e.g., each time a virtual workload (virtual machine) is provisioned.

After provisioning the second port group 220 in the method 400, the method can return to block 430 and the operations of the block 430 and 440 can be repeated, where the usage of virtual ports of the second port group (alone or in conjunction with usage of the virtual ports of the first virtual port group 210) can be monitored. In some implementations, a first threshold (or first usage criteria) can be used to monitor usage of the first virtual port group 210, while a second threshold (or second usage criteria) can be used to monitor usage of the second virtual port group 220. The first and second thresholds (criteria) can be the same, or can be different, depending on the specific implementation. If the second threshold is exceeded (or the second usage criteria is met), a third virtual port group can be provisioned (e.g., assuming additional IP addresses and virtual computing resources of the VLAN 140 are available).

Figure 4B:
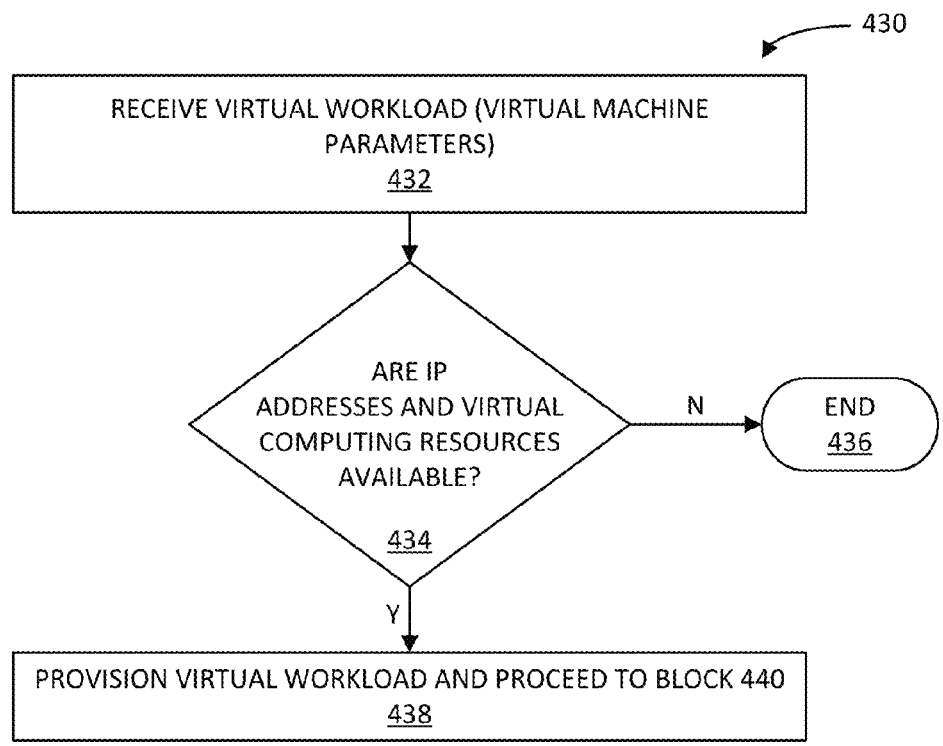
FIG. 4B is a flowchart illustrating a method for provisioning a virtual workload (e.g., virtual machine) that can be implemented in the method of FIG. 4A, according to an example implementation.

FIG. 4B is a flowchart illustrating a method 430 for provisioning a virtual workload (e.g., virtual machine) that can be implemented as block 430 in the method 400 of FIG. 4A, according to an example implementation. At block 432 of the method 430, parameters for a virtual workload can be received. For instance, in the example above, parameters for provisioning the virtual machine 150B can be received at the virtualization manager 160 (e.g., entered by an administrator).

At block 434 of the method 430, the virtualization manager 160 (e.g., the virtual port provisioner 162) can determine whether there are available IP addresses and/or virtual computing resources available in the associated VLAN 140 for provisioning (implementing) the virtual workload of block 432. If sufficient IP addresses and/or virtual computing resources are not available for provisioning the virtual workload of block 432, the method 430 can proceed to 436 and terminate without the virtual workload of 432 being provisioned. In certain embodiments, in this situation, the method 430, at block 434 may loop back on itself until sufficient resources (e.g., IP addresses and/or virtual computing resources) are available for provisioning the virtual workload of block 432 (e.g., resources are freed up and/or added). As with monitoring virtual port usage in implementing the method 400, the port group provisioner 162 can monitor available virtual resources of the VLAN 140 (e.g., at block 434) in response to a request to provision a virtual workload (e.g., at block 432).

If, at block 434, there are sufficient resources available to provision the virtual workload of block 423, the method 430 can continue to block 438, where the virtual workload of block 432 is provisioned and the method provisioned and the method can proceed to block 440 of the method 400 in FIG. 4A. In certain implementations, the block 440 of the method 400 can be implemented as described below with respect to FIG. 4C.

Figure 4C:
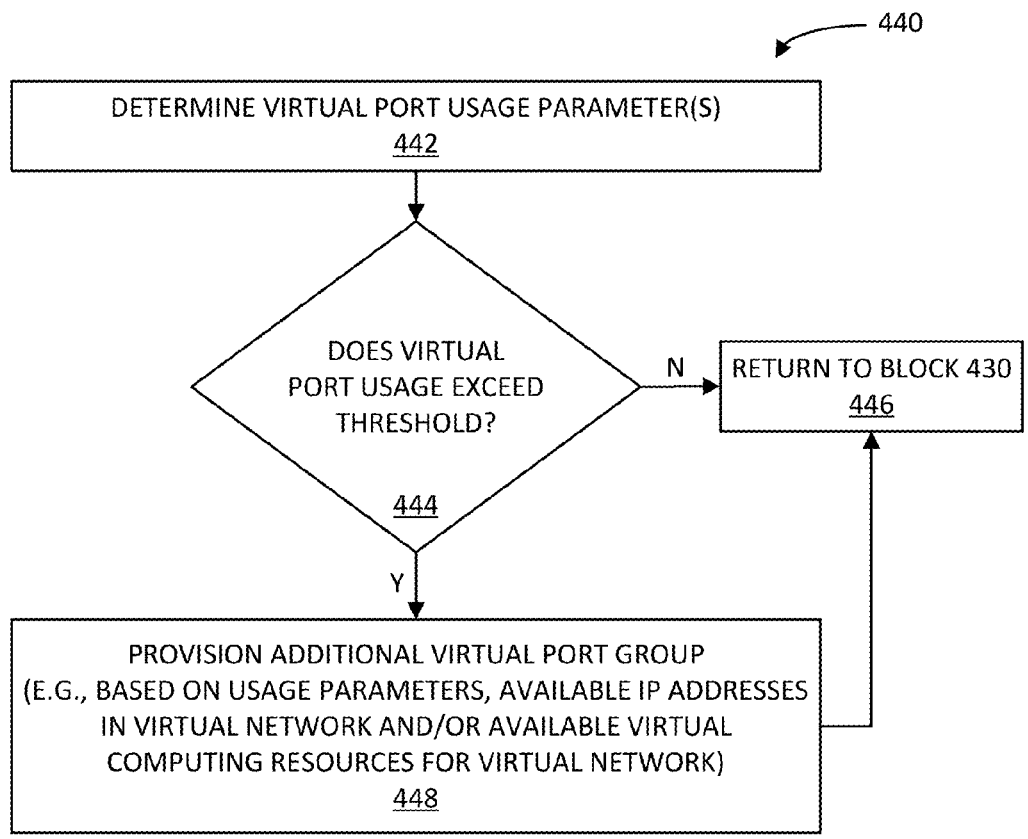
FIG. 4C is a flowchart illustrating a method for monitoring virtual ports usage and provisioning additional virtual ports (e.g. port groups or port profiles) that can be implemented in the method of FIG. 4A, according to an example implementation.

FIG. 4C is a flowchart illustrating a method 440 for monitoring virtual port usage and provisioning additional virtual ports (e.g. port groups or port profiles), which can be implemented as block 440 in the method of FIG. 4A, according to an example implementation. At block 442 of the method 440, e.g., in response to the provisioning of a virtual workload at block 430 of the method 400, the port group provisioner can determine on or more virtual port usage parameters.

At block 444, the method 440 can include determining if virtual port usage of a virtual port group being monitored (e.g., the virtual port group 210) exceeds a corresponding threshold (or meets certain usage criteria). If the threshold of block 444 is not exceeded (or the usage criteria is not met), the method 440 can continue to block 446, and the method can return to block 430 of the method 400. If, at block 444, the usage parameters for block 442 for the virtual ports (virtual port group(s)) being monitored does exceed the threshold (or meets the usage criteria), the method 448 can proceed to block 448, and the port group provisioner 1620 can provision an additional virtual port group (e.g., the virtual port group 220 in the example discussed above), or can provision more than one additional port group. For purposes of clarity and illustration, dynamic provisioning of a single port group at block 448 is described herein, though in other implementations, multiple virtual port groups can be dynamically provisioned at block 448.

In the method 400 of FIG. 4A (and the corresponding methods of FIGS. 4B and 4C), determining virtual port usage parameters, determining whether, based on the determined parameters, to provision additional virtual ports (e.g., in a virtual port group or groups) and/or provisioning the additional virtual ports (e.g., port group(s) or port profile(s)) can be implemented in a number of ways. For instance, the virtual port provisioner 162 may be configured to track usage patterns of previously provisioned virtual ports and the underlying virtual computing resources of the VLAN 140. Said another way, the virtual port provisioner 162 can monitor (learn) resource usage patterns for the VLAN 140 (and associated virtual workloads), and provisioning of virtual port groups at block 448 can be dependent on that monitored (learned) behavior for the VLAN 140 (or for other cloud computing entities).

For example, the virtual port provisioner 162 can monitor respective amounts of available resources (e.g., IP addresses, virtual ports, virtual computing resources), as well as respective rates of consumption of those resources. The virtual port provisioner 162 can then determine whether or not to provision additional virtual ports (e.g., as port groups or port profiles) based on the usage parameters it is configured to monitor. The virtual port provisioner 162 can also determine a number of virtual ports to provision based on the behavior (resource usage patterns) of an associated cloud computing (IaaS) system.

For instance, in the above example, a number of virtual ports that are included in the second port group 220, when provisioned, can simply be equal to a number of virtual ports in the first port group 210. Alternatively, the number of virtual ports that are included in the second port group 220, when provisioned, can be equal to a largest value in an allowable range of ports that can be included for the specific configuration of the vSwitch 130, as can be determined at block 420 (which can be a different number of virtual ports than in the first virtual port group 210). In other implementations, the number of virtual ports in the first virtual port group 210 can be equal to a largest value in an allowable range for the specific vSwitch 120, while the number of virtual ports in the second virtual port group 210 is less than the largest value in the allowable range.

In some instances, the number of virtual ports in the second virtual port group 220, when provisioned, can be equal to a number of unassigned Internet Protocol (IP) addresses of the VLAN 140. In other instances, the number of virtual ports in the second virtual port group 220, when provisioned, can be based on an amount of available virtual computing resources of the VLAN 140. In still other instances, the number of virtual ports in the second virtual port group 220, when provisioned, can be based on a rate of consumption of virtual ports in the first virtual port group 210 and/or on a rate of consumption of the virtual computing resources of the VLAN 140.

According to an implementation, a computer-implemented method can include provisioning a virtual network on a hypervisor server, where the hypervisor server is configured to provide virtual computing resources for implementing the virtual network. The method can further include querying the hypervisor server to determine an allowable range for a number of virtual ports of a first port group of a virtual switch implemented on the hypervisor server, where the first port group is associated with the virtual network. The method can still further include provisioning at least one virtual machine on the virtual network. The provisioning of a virtual machine of the at least one virtual machine can include assigning a respective virtual port of the first port group to the virtual machine. The method can also further include monitoring usage of the virtual ports of the first port group and, in response to the usage of the virtual ports of the first port group exceeding a threshold, instructing the hypervisor server to provision a second port group on the virtual switch. The second port group can be associated with the virtual network.

Implementations can include one or more of the following features. For instance, a number of virtual ports in the second port group can be equal to the number of virtual ports in the first port group. The number of virtual ports in the second port group and the number of virtual ports in the first port group can be equal to a largest value in the allowable range. A number of virtual ports in the second port group can be different than the number of virtual ports in the first port group. The number of virtual ports in the first port group can be equal to a largest value in the allowable range and the number of virtual ports in the second port group can be less than the largest value in the allowable range. A number of virtual ports in the second port group can be equal to a number of unassigned Internet Protocol (IP) addresses of the virtual network. A number of virtual ports in the second port group can be based on a rate of consumption of virtual ports in the first port group.

Provisioning the second port group can include provisioning the second port group with a same set of quality of service parameters as the first port group.

Assigning the respective virtual port of the first port group to the virtual machine can include assigning a respective Internet Protocol (IP) address of the virtual network to a virtual network-interface card of the virtual machine.

The threshold can be a first threshold, and the computer-implemented method can include monitoring usage of the virtual ports of the second port group and, in response to the usage of the virtual ports in the second port group exceeding a second threshold, instructing the hypervisor server to provision a third port group on the virtual switch, the third port group being associated with the virtual network. The second threshold can be different than the first threshold.

Monitoring the usage of the virtual ports of the first port group can be performed in response to the provisioning of the virtual machine of the at least one virtual machine. The method can include monitoring an amount of available virtual computing resources of the virtual network. A number of virtual ports in the second port group can be based on the amount of available virtual computing resources. Monitoring the amount of available virtual computing resources of the virtual network can be performed in response to the provisioning of the virtual machine of the at least one virtual machine.

In another implementation, a non-transitory computer-readable storage medium can have instructions recorded and stored thereon. The instructions, when executed by a computing device, can cause the computing device to provision a virtual network on a hypervisor server. The hypervisor server can be configured to provide virtual computing resources for implementing the virtual network. The instructions, when executed by the computing device, can further cause the computing device to query the hypervisor server to determine an allowable range for a number of virtual ports of a first port group of a virtual switch implemented on the hypervisor server, where the first port group is associated with the virtual network. The instructions, when executed by the computing device, can still further cause the computing device to provision at least one virtual machine on the virtual network. The provisioning of a virtual machine of the at least one virtual machine can include assigning a respective virtual port of the first port group to the virtual machine. The instructions, when executed by the computing device, can also further cause the computing device to monitor usage of the virtual ports of the first port group and, in response to the usage of the virtual ports of the first port group exceeding a threshold, instruct the hypervisor server to provision a second port group on the virtual switch. The second port group can be associated with the virtual network.

Implementations can include one or more of the following features. For instance, the threshold can be a first threshold. The instructions, when executed by the computing device, can cause the computing device to monitor usage of the virtual ports of the second port group and, in response to the usage of the virtual ports in the second port group exceeding a second threshold, instruct the hypervisor server to provision a third port group on the virtual switch, the second port group being associated with the virtual network. The instructions, when executed by the computing device, can further cause the computing device to monitor an amount of available virtual computing resources of the virtual network. A number of virtual ports in the second port group can be based on the amount of available virtual computing resources.

In another implementation, a system can include a host server including a set of physical computing resources, a hypervisor server configured to virtualize the set of physical computing resources of the host server and a virtual network management server. The virtual network management server can include at least one memory that is configured to store instructions and at least one processor that is operably coupled to the at least one memory. The at least one processor can be configured to process the instructions to cause the virtual network management server to provision a virtual network on the hypervisor server, the hypervisor server being configured to provide virtual computing resources for implementing the virtual network. The instructions, when processed by the at least one processor, can further cause the virtual network management server to query the hypervisor server to determine an allowable range for a number of virtual ports of a first port group of a virtual switch implemented on the hypervisor server, where the first port group can be associated with the virtual network. The instructions, when processed by the at least one processor, can further cause the virtual network management server to provision at least one virtual machine on the virtual network. The provisioning of a virtual machine of the at least one virtual machine can include assigning a respective virtual port of the first port group to the virtual machine. The instructions, when processed by the at least one processor, can still further cause the virtual network management server to monitor usage of the virtual ports of the first port group and, in response to the usage of the virtual ports of the first port group exceeding a threshold, instruct the hypervisor server to provision a second port group on the virtual switch. The second port group can be associated with the virtual network.

Implementations can include one or more of the following features. For instance, the host server can be a first host server and the set of physical computing resources can be a first set of physical computing resources. The system can further include a second host server including a second set of physical computing resources; a non-volatile data storage device and a physical data network operationally coupled with the first host server, the second host server and the non-volatile data storage device. The hypervisor server can be configured to virtualize the second set of physical computing resources and the non-volatile data storage device. The set of physical computing resources of the first host sever and/or the second host server can include at least one processor, a non-volatile data storage device and volatile data storage.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A computer-implemented method comprising:
   provisioning a virtual network on a hypervisor server, the hypervisor server being configured to provide virtual computing resources for implementing the virtual network;
   querying the hypervisor server to determine an allowable range for a number of virtual ports of a first port group of a virtual switch implemented on the hypervisor server, the first port group being allocated to the virtual network;
   provisioning at least one virtual machine on the virtual network, the provisioning of a virtual machine of the at least one virtual machine including assigning a respective virtual port of the first port group to the virtual machine;
   monitoring usage of the virtual ports of the first port group; and
   in response to the usage of the virtual ports of the first port group exceeding a threshold, instructing the hypervisor server to provision a second port group on the virtual switch, the second port group being allocated to the virtual network in addition to the first port group.

2. The computer-implemented method of claim 1, wherein a number of virtual ports in the second port group and the number of virtual ports in the first port group is equal to a largest value in the allowable range.

3. The computer-implemented method of claim 1, wherein a number of virtual ports in the second port group is based on a rate of consumption of virtual ports in the first port group.

4. The computer-implemented method of claim 1, wherein the threshold is a first threshold, the computer-implemented method further comprising:
   monitoring usage of the virtual ports of the second port group; and
   in response to the usage of the virtual ports in the second port group exceeding a second threshold, instructing the hypervisor server to provision a third port group on the virtual switch, the third port group being allocated to the virtual network.

5. The computer-implemented method of claim 4, wherein the second threshold is different than the first threshold.

6. The computer-implemented method of claim 1, wherein a VLAN identification and a quality-of-service parameter associated with the first port group are also associated with the second port group.

7. The computer-implemented method of claim 1, further comprising:
   querying the hypervisor server to determine a second allowable range for a number of virtual ports of the second port group.

8. The computer-implemented method of claim 1, wherein the allowable range for the number of virtual ports of the first port group of the virtual switch is based on an architecture of the hypervisor server.

9. A computer-implemented method comprising:
   provisioning a virtual network on a hypervisor server, the hypervisor server being configured to provide virtual computing resources for implementing the virtual network;
   querying the hypervisor server to determine an allowable range for a number of virtual ports of a first port group of a virtual switch implemented on the hypervisor server, the first port group being associated with the virtual network;
   provisioning at least one virtual machine on the virtual network, the provisioning of a virtual machine of the at least one virtual machine including assigning a respective virtual port of the first port group to the virtual machine;
   monitoring usage of the virtual ports of the first port group; and
   in response to the usage of the virtual ports of the first port group exceeding a threshold, instructing the hypervisor server to provision a second port group on the virtual switch, the second port group being associated with the virtual network, the number of virtual ports in the first port group being equal to a largest value in the allowable range, and a number of virtual ports in the second port group being less than the largest value in the allowable range.

10. A computer-implemented method comprising:
    provisioning a virtual network on a hypervisor server, the hypervisor server being configured to provide virtual computing resources for implementing the virtual network;
    querying the hypervisor server to determine an allowable range for a number of virtual ports of a first port group of a virtual switch implemented on the hypervisor server, the first port group being associated with the virtual network;
    provisioning at least one virtual machine on the virtual network, the provisioning of a virtual machine of the at least one virtual machine including assigning a respective virtual port of the first port group to the virtual machine;
    monitoring usage of the virtual ports of the first port group; and
    in response to the usage of the virtual ports of the first port group exceeding a threshold, instructing the hypervisor server to provision a second port group on the virtual switch, the second port group being associated with the virtual network, and a number of virtual ports in the second port group being equal to a number of unassigned Internet Protocol (IP) addresses of the virtual network.

11. A computer-implemented method comprising:
    provisioning a virtual network on a hypervisor server, the hypervisor server being configured to provide virtual computing resources for implementing the virtual network;
    querying the hypervisor server to determine an allowable range for a number of virtual ports of a first port group of a virtual switch implemented on the hypervisor server, the first port group being associated with the virtual network;
    provisioning at least one virtual machine on the virtual network, the provisioning of a virtual machine of the at least one virtual machine including assigning a respective virtual port of the first port group to the virtual machine;
    monitoring usage of the virtual ports of the first port group;
    in response to the usage of the virtual ports of the first port group exceeding a threshold, instructing the hypervisor server to provision a second port group on the virtual switch, the second port group being associated with the virtual network; and
    monitoring an amount of available virtual computing resources of the virtual network, a number of virtual ports in the second port group being based on the amount of available virtual computing resources.

12. The computer-implemented method of claim 11, wherein provisioning the second port group includes provisioning the second port group with a same set of quality of service parameters as the first port group.

13. The computer-implemented method of claim 11, wherein assigning the respective virtual port of the first port group to the virtual machine includes assigning a respective Internet Protocol (IP) address of the virtual network to a virtual network-interface card of the virtual machine.

14. The computer-implemented method of claim 11, wherein monitoring the usage of the virtual ports of the first port group is performed in response to the provisioning of the virtual machine of the at least one virtual machine.

15. The computer-implemented method of claim 11, wherein monitoring the amount of available virtual computing resources of the virtual network is performed in response to the provisioning of the virtual machine of the at least one virtual machine.

16. A non-transitory computer-readable storage medium having instructions recorded and stored thereon, the instructions, when executed by a computing device, cause the computing device to:
provision a virtual network on a hypervisor server, the hypervisor server being configured to provide virtual computing resources for implementing the virtual network;
query the hypervisor server to determine an allowable range for a number of virtual ports of a first port group of a virtual switch implemented on the hypervisor server, the first port group being associated with the virtual network;
provision at least one virtual machine on the virtual network, the provisioning of a virtual machine of the at least one virtual machine including assigning a respective virtual port of the first port group to the virtual machine;
monitor usage of the virtual ports of the first port group;
in response to the usage of the virtual ports of the first port group exceeding a threshold, instruct the hypervisor server to provision a second port group on the virtual switch, the second port group being associated with the virtual network; and
monitor an amount of available virtual computing resources of the virtual network, a number of virtual ports in the second port group being based on the amount of available virtual computing resources.

17. The non-transitory computer-readable storage medium of claim 16, wherein the threshold is a first threshold, the instructions, when executed by the computing device, further cause the computing device to:
monitor usage of the virtual ports of the second port group; and
in response to the usage of the virtual ports in the second port group exceeding a second threshold, instruct the hypervisor server to provision a third port group on the virtual switch, the second port group being associated with the virtual network.

18. A system comprising:
a host server including a set of physical computing resources;
a hypervisor server configured to virtualize the set of physical computing resources of the host server; and
a virtual network management server including:
at least one memory that is configured to store instructions; and
at least one processor that is operably coupled to the at least one memory and that is configured to process the instructions to cause the virtual network management server to:
provision a virtual network on the hypervisor server, the hypervisor server being configured to provide virtual computing resources for implementing the virtual network;
query the hypervisor server to determine an allowable range for a number of virtual ports of a first port group of a virtual switch implemented on the hypervisor server, the first port group being associated with the virtual network;
provision at least one virtual machine on the virtual network, the provisioning of a virtual machine of the at least one virtual machine including assigning a respective virtual port of the first port group to the virtual machine;
monitor usage of the virtual ports of the first port group;
in response to the usage of the virtual ports of the first port group exceeding a threshold, instruct the hypervisor server to provision a second port group on the virtual switch, the second port group being associated with the virtual network; and
monitor an amount of available virtual computing resources of the virtual network, a number of virtual ports in the second port group being based on the amount of available virtual computing resources.

19. A system comprising:
a first host server including a first set of physical computing resources;
a second host server including a second set of physical computing resources;
a non-volatile data storage device;
a physical data network operationally coupled with the first host server, the second host server, and the non-volatile data storage device;
a hypervisor server configured to:
virtualize the first set of physical computing resources of the first host server,
virtualize the second set of physical computing resources of the second host server, and
virtualize the non-volatile data storage device; and
a virtual network management server including:
at least one memory that is configured to store instructions; and
at least one processor that is operably coupled to the at least one memory and that is configured to process the instructions to cause the virtual network management server to:
provision a virtual network on the hypervisor server, the hypervisor server being configured to provide virtual computing resources for implementing the virtual network;
query the hypervisor server to determine an allowable range for a number of virtual ports of a first port group of a virtual switch implemented on the hypervisor server, the first port group being associated with the virtual network;
provision at least one virtual machine on the virtual network, the provisioning of a virtual machine of the at least one virtual machine including assigning a respective virtual port of the first port group to the virtual machine;
monitor usage of the virtual ports of the first port group; and in response to the usage of the virtual ports of the first port group exceeding a threshold, instruct the hypervisor server to provision a second port group on the virtual switch, the second port group being associated with the virtual network.

20. The system of claim 18, wherein the set of physical computing resources of the host server includes:
at least one processor;
a non-volatile data storage device; and
volatile data storage.

* * * * *